Dec. 1, 1959            B. A. KNAUTH           2,915,606
MECHANISM FOR MEASURING LINEAR FLOW IN FLOWMETERS
AS A FUNCTION OF ROTARY MOTION THEREIN
Filed Sept. 13, 1956

INVENTOR
BERTHOLD A. KNAUTH

BY *Andros & Smith*

ATTORNEYS

UNITED STATES PATENT OFFICE 2,915,606
Patented Dec. 1, 1959

2,915,606

MECHANISM FOR MEASURING LINEAR FLOW IN FLOWMETERS AS A FUNCTION OF ROTARY MOTION THEREIN

Berthold A. Knauth, High Falls, N.Y.

Application September 13, 1956, Serial No. 609,711

12 Claims. (Cl. 200—87)

This invention relates, for example, to a flowmeter of the type in which a shaft within the flow passage is rotated and is directed particularly to a means to translate the rotary motion of the shaft to linear motion outside of the flow passage without providing a mechanical connection through the wall of said flow passage, so that a mechanical device, or an electric switch mechanism, may be operated to indicate, or to measure, the linear flow in the flow passage.

This application is a continuation in part of the subject matter of application Serial No. 539,827, filed October 11, 1955, (now Patent No. 2,843,698), as well as my co-pending application Serial No. 532,187, filed Sept. 2, 1955, and Serial No. 609,708, filed Sept. 13, 1956, (now Patent No. 2,845,798) having to do with such flowmeters, and therein more specificaly described as vortex-velocity flowmeters for the straight through linear flow of fluid and containing a vortex cage rotating on an axis normal to said flow, whereby to measure the linear flow as a function of the rotary motion of the cage to determine the volumetric through-put of the flowmeter.

The device of the present invention provides a simple and effective means to count the revolutions of a shaft within a flow passage.

It is an object of the present invention to provide a simple, reliable means accurately to indicate the number of revolutions made by a revolving device within an enclosure.

A further object of the present invention is to provide a novel magnetic actuating means to translate rapid rotary motion directly to a reciprocating motion, and which may be used either to actuate a switch mechanism, a mechanical register, or both.

It is still another object of the present invention to provide a switch mechanism of the above type which may be used in connection with flowmeters where it is capable of being actuated mechanically, and wherein the switch mechanism will function even when submerged in the cavity of the flowmeter through which gasoline or other liquid is passing, although the switch mechanism itself is not limited to this application.

Other and further objects and advantages of the device will be apparent from the following description, taken in connection with the accompanying drawing, in which like characters of reference designate similar parts in the several views, and in which.

Figure 1:
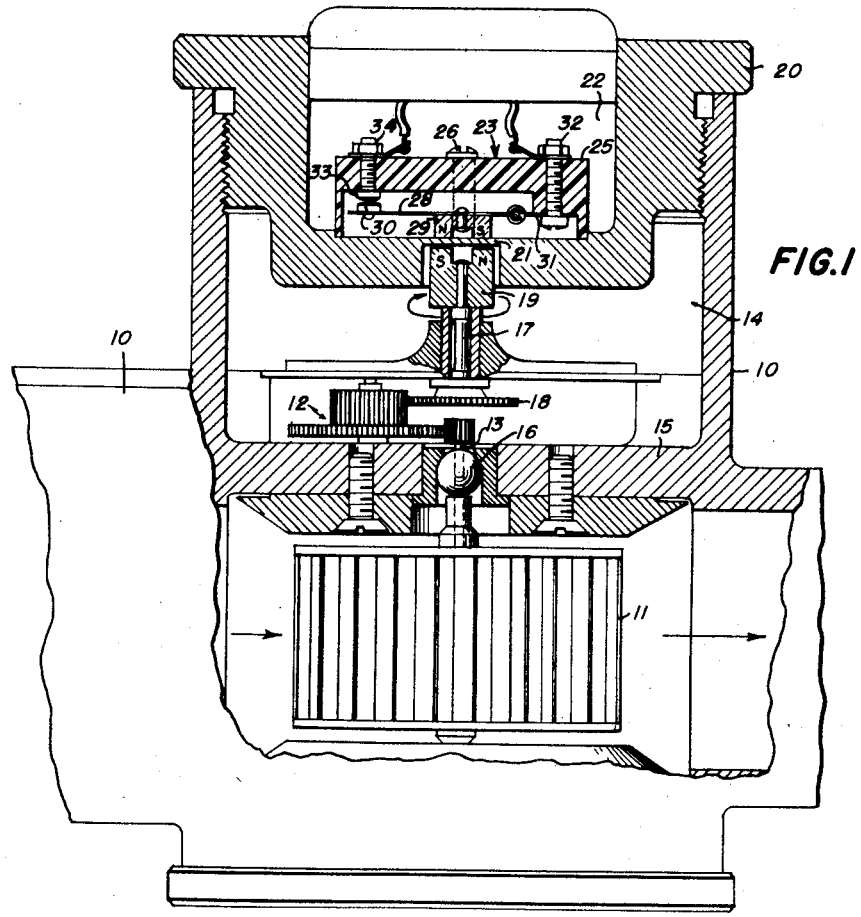
Figure 1 is a fragmentary section of a flowmeter showing one form of the switch device installed therein.

Referring now more particularly to Figure 1, the device is illustrated in use with a flowmeter which may be used, for example, to meter explosive or poisonous fluids, in which case even a very slight leakage could result in serious consequences. For instance, where an explosive fluid is being metered, it is essential that the vapor of the fluid be strictly contained and prevented from entering any switch device in which an arc may occur.

In Figure 1, 10 indicates the body structure of a flowmeter which is shown as including a wheel 11, for driving the device, mounted in the fluid flow passage. This wheel 11 drives a set of reduction gears indicated generally at 12 by means of a shaft 13 extending into an enclosure 14, enclosed by the wall of body 10, through a partition 15 separating the enclosure 14 from the flow passage. A bearing 16 for the shaft 13 is mounted in the partition 15. Reduction gears 12 drive a shaft 17 by means of gear 18. On the other end of shaft 17, extending outwardly, is a permanent magnet 19. Enclosure 14 is closed by a closure element 20, shown in Figure 1 as being screwed into the wall of the body of the meter. This closure can, and will, of course, be made vapor and liquid tight.

Figure 3:
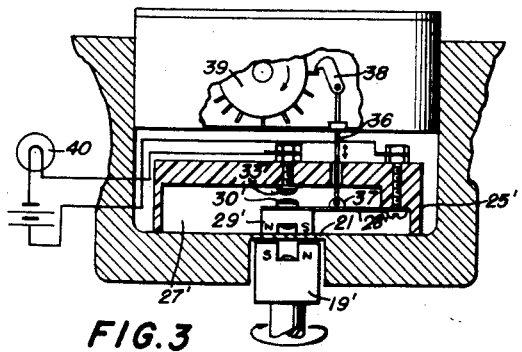
Figure 3 is a view somewhat similar to Figure 1 showing a slightly different form of the device.

As seen in Figures 1 and 3, the closure portion 20 is provided with a thin spot or area 21, constituting a diaphragm of non-magnetic material, whereby the magnetic effect of magnet 19 will be impaired as little as possible by the presence of the solid closure.

Closure 20 preferably is provided with a recess 22 in which, as shown in Figure 1, a switch 23 is mounted; and in Figure 3, in which a combination switch and ratchet operating device 24 is mounted.

Figure 2:
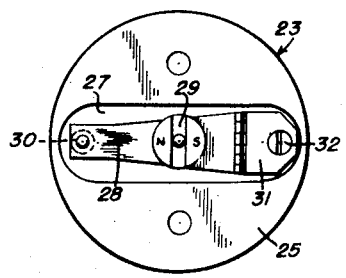
Figure 2 is a bottom view of the device shown in Figure 1.

Switch 23 is shown in Figures 1 and 2 and, as there seen, comprises a shell 25 which may be tightly secured in closure 20 by bolts 26. A recess in the underside of shell 25 provides a space for the moving part of the device. Within this recess is a support, or leaf element, 28 to which is attached a magnet 29, and an electrical contact element 30. The electrical contact element is located at one end of the leaf element 28, and the magnet 29 is mounted therein so as to be disposed at the middle of recess 27 in order to be positioned immediately over the thin spot or area 21, and magnet 19, which is immediately therebeneath. Leaf element 28 may be a spring but preferably is hinged at its end remote from electrical contact 30 to an element 31 which is secured to shell 25 by a bolt 32 which also acts as an electrical lead for the switch. In shell 25, extending into said recess, opposite the electrical contact 30, is a second electrical contact 33 formed as the head of a bolt 34 which acts as the second electric lead of the switch.

It will be noted in Figure 1 that, as there shown, magnet 29 is pulled toward magnet 19 so that electric contact 30 is pulled away from electric contact 33 and, it will be understood, that when magnet 19 is rotated 180 degrees, magnet 29 will be thrust away from magnet 19, which will bring electric contact 30 against contact 33 to close the electric circuit through the switch.

This device differs from the devices of the applications referred to above in that a single contact is provided and, due to the leverage of leaf support 28 about said hinge, less motion of the magnet will be required to make and break the electrical circuit. Furthermore, the reduction in the necessary movement of magnet 29 makes it possible for this device to follow even more rapid rotation of magnet 19 than is possible with the device of the earlier application.

Support leaf 28, and its associated portion 31, may, of course, be made of a unitary strip of material having the required flexibility, as above indicated, to permit reciprocation of the magnet 29 in a manner similar to the hinge structure. It is only necessary that the elements 28 and 31 prevent the magnet 29 from rotating and hold it in position axially over the magnet 19.

Since it may be desirable to mount such a device horizontally, as shown in Figure 1, in which case, the only forces acting on support 28 are the attraction and repulsion forces between magnets 19 and 29, and the very slight friction in the hinge, or vertically in a position such that the weight of support 28, magnet 29, and contact 30, normally bias the contacts into either opened or closed positions, it may be desirable to form supports 28 and 31 of an integral piece of spring material so mounted or shaped as to counteract the gravitational effect, operating to bias the device, one way or the other, according to the direction of gravitational pull.

The device of Figure 3 is for use primarily as an actuating means for a mechanical counter and is shown as having a magnet 29' mounted on a flexible leaf element 28' in a manner similar to the device of Figure 1. It will be understood, of course, that element 28' may be formed as a hinged element similar to the showing of Figure 1, or it may be of a spring material with the appropriate bias to overcome the effect of gravity.

A link 36 is secured to support 28' by any appropriate means such as a lug 37. Link 36 extends upwardly through shell 25' to a hook element 38 that operates on ratchet wheel 39, and which is shown only diagrammatically.

It will be noticed that lug 37 is on the pivot side of magnet 29', as shown, in order to take advantage of the longer lever arm to give a stronger pull on link 36 to operate the mechanical elements 38 and 39. It may, of course, be desirable to have lug 37 and link 36 located further from the pivot point of magnet 29' in order to give a longer motion to the link.

There is also shown in Figure 3 electric contacts 30' and 33' which are similar to contacts 30 and 33 in Figure 1, but are shown in Figure 3 as operating an indicator 40 which may be a flashing light or any other form of indicator desired and which may be mounted at a point remote from the flowmeter.

It will be seen that a very simple device is provided in which the contents of the flow passage of a meter of the type indicated is positively prevented from gaining access to the counting switch for mechanism and which accurately can and will follow and count the revolutions of a rotating magnet even while this magnet is immersed in a fluid or a confined atmosphere.

Having described my invention what I claim as new and desire to secure by Letters Patent is:

1. In a counting mechanism for measuring linear flow in a vortex-velocity flowmeter as a function of rotary motion around an axis normal to said linear flow, an electrically non-conducting housing having an open side, a permanent magnet positioned within said housing and adapted for rapid axial movement therein, said magnet having north and south poles, leaf means to which said magnet is secured having one fixed and one movable end for preventing angular displacement of said magnet in said housing, an electric contact mounted on the movable end of said leaf, a terminal fixedly mounted within said housing, extending into the interior thereof and adapted to be contacted by said electrical contact on said leaf, a non-magnetic diaphragm in said housing adjacent said magnet, a second permanent magnet having north and south poles positioned on the side of said diaphragm opposite from said first permanent magnet, and having its poles extending toward said first permanent magnet in coaxial alignment therewith, and a rotary member, to which said second magnet is attached, cooperatively connected rapidly to rotate in response to a rotatable member axially within the rotary motion of the fluid passing through said flowmeter, whereby, upon rotation of said second permanent magnet, said first permanent magnet is alternately repelled and attracted rapidly to open and close said electrical contacts for operation of an electric register.

2. The mechanism of claim 1 in which said leaf is an integral flexible element.

3. The mechanism of claim 1 in which said movable end of said leaf is hinged to said fixed end.

4. In a counting mechanism for measuring linear flow in a vortex-velocity flowmeter as a function of rotary motion around an axis normal to said linear flow, a housing, a first permanent magnet having a north and a south pole, positioned within said housing and having its poles extending in the same axial direction, and adapted for rapid axial movement therewithin, leaf means on which said magnet is mounted for preventing angular displacement of said magnet within said housing, said leaf means having one fixed and one movable end and being so constructed and arranged as to permit limited axial movement of said first permanent magnet, a non-magnetic diaphragm closing the side of said housing adjacent said magnet poles, a second permanent magnet having north and south poles rotatably positioned on the opposite side of said diaphragm from said first permanent magnet, and having its poles extending axially toward said first permanent magnet, a ratchet operating means connected to said leaf adjacent said first permanent magnet, and a rotary member, to which said second magnet is attached, cooperatively connected to rapidly rotate in response to a rotary member axially within said flowmeter in accordance with the flow of fluid therethrough, whereby, upon rotation of said second permanent magnet said first permanent magnet is alternately repelled and attracted to rapidly move said leaf and to actuate said ratchet operating means.

5. The mechanism of claim 4 in which said leaf is an integral flexible element.

6. The mechanism of claim 4 in which said movable end of said leaf is hinged to said fixed end.

7. In a vortex-velocity flowmeter, an enclosed flow passage having a straight through flow portion, a vortex cage within said passage adapted to be rotated by the linear flow of fluid in said flow passage around an axis normal to said flow, a first permanent magnet mounted on a rotatable shaft with its poles extending axially toward a non-magnetic diaphragm closing said flow passage adjacent said cage, means connecting said cage and said shaft for rotating said magnet, a second permanent magnet axially aligned with said first permanent magnet adjacent the opposite side of said diaphragm from said flow passage, and having its poles axially extending toward said first permanent magnet, said second permanent magnet being mounted for limited but rapid axial motion with respect to said diaphragm, means to prevent rotation of said second permanent magnet, and means mounted for movement with said second permanent magnet to operate a register for counting the number of revolutions of said cage as a function of said linear flow to determine the volumetric through-put of said flowmeter.

8. The device of claim 7 in which said second permanent magnet is mounted on a flexible leaf element fixed at one end.

9. The mechanism of claim 8 in which said leaf is an integral flexible element.

10. The mechanism of claim 8 in which the portions of said leaf on which said second permanent magnet is mounted is hinged to said fixed end.

11. The device of claim 7 in which said means mounted for movement with said second permanent magnet is an electric contact and a second electric contact is so mounted that upon movement of said second permanent magnet, within its limits of motion, said contacts alternately engage and disengage to actuate an electric register.

12. The device of claim 7 in which said means mounted for movement with said second permanent magnet is a pawl element that operates a ratchet drive of a mechanical register.

References Cited in the file of this patent

UNITED STATES PATENTS

| | | |
|---|---|---|
| 1,743,478 | Pratt | Jan. 14, 1930 |
| 2,112,214 | Tognola | Mar. 22, 1938 |

(Other references on following page)

UNITED STATES PATENTS

| | | |
|---|---|---|
| 2,231,158 | Davis | Feb. 11, 1941 |
| 2,323,910 | Hubbell | July 13, 1943 |
| 2,333,791 | Hutchison | Nov. 9, 1943 |
| 2,352,830 | Ford | July 4, 1944 |
| 2,448,779 | Crise | Sept. 7, 1948 |
| 2,548,581 | Bigelow | Apr. 10, 1951 |
| 2,595,407 | Purrier | May 6, 1952 |
| 2,620,412 | Ford | Dec. 2, 1952 |
| 2,649,712 | Dale | Aug. 25, 1953 |